June 25, 1940.   E. P. DRAKE   2,205,397
AUTOMATIC PITTING MACHINE
Filed Aug. 23, 1937   11 Sheets-Sheet 1

Edward P. Drake
Inventor

By
Attorney

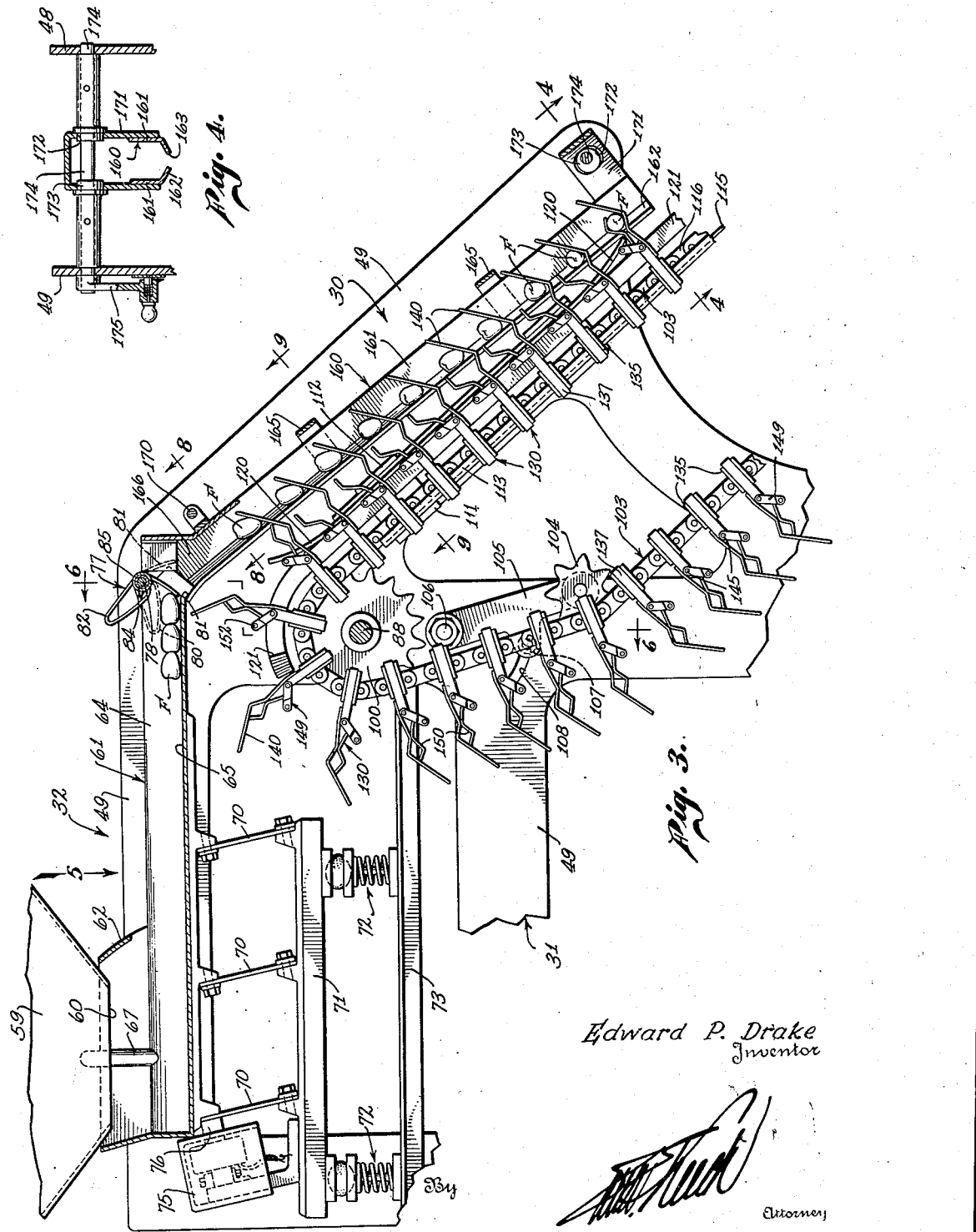

Edward P. Drake, Inventor

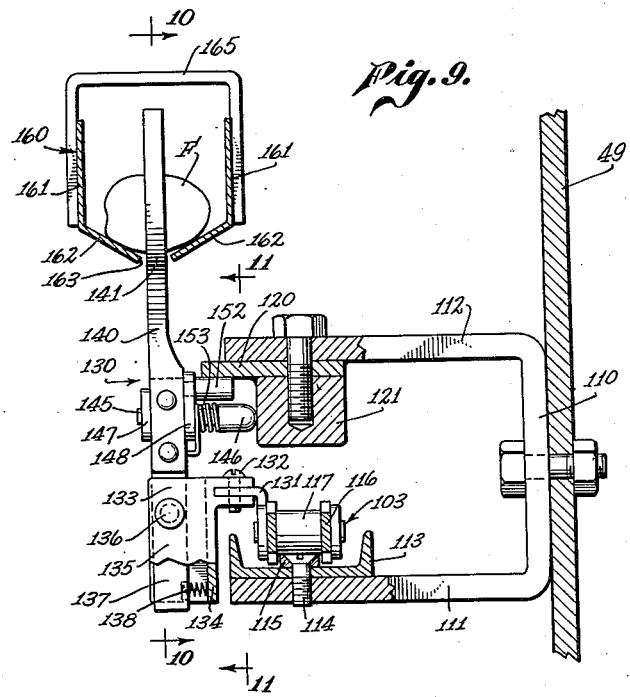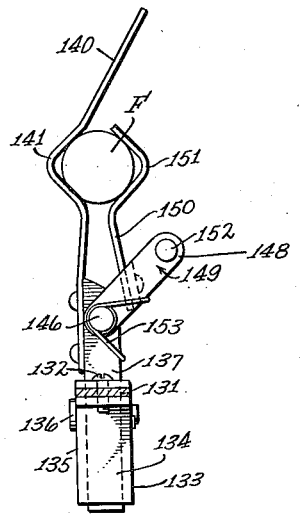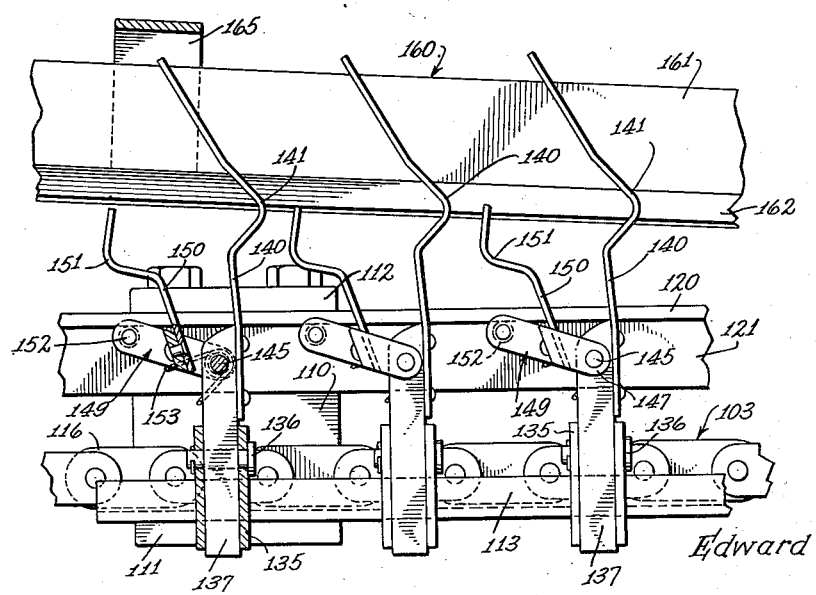

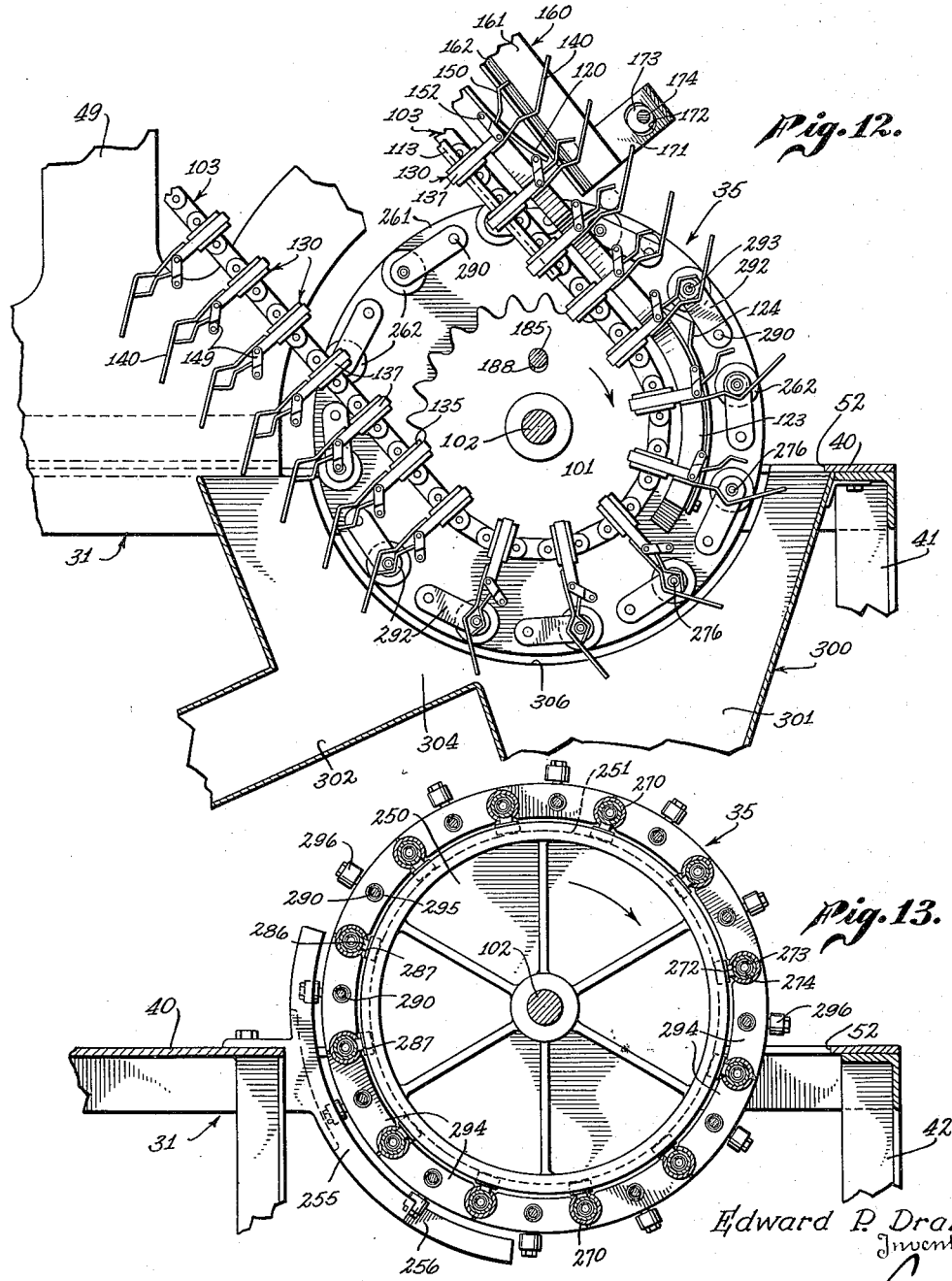

June 25, 1940.    E. P. DRAKE    2,205,397
AUTOMATIC PITTING MACHINE
Filed Aug. 23, 1937    11 Sheets-Sheet 7

Edward P. Drake
INVENTOR

By

ATTORNEY

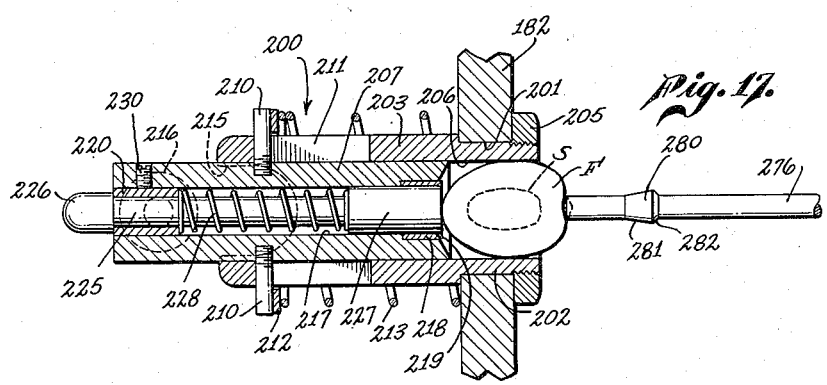
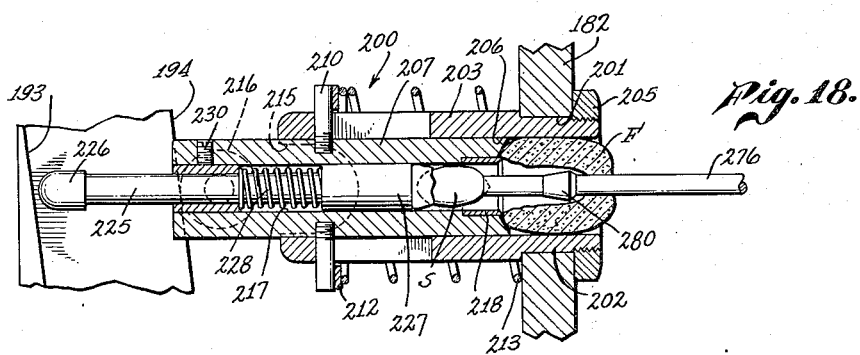
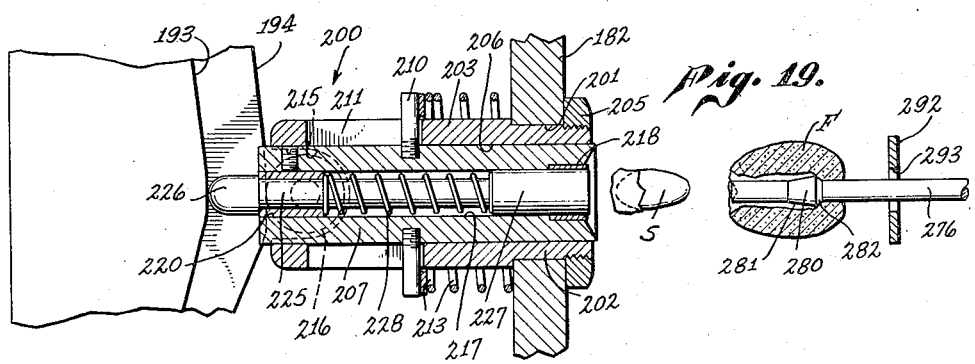

June 25, 1940. E. P. DRAKE 2,205,397
AUTOMATIC PITTING MACHINE
Filed Aug. 23, 1937 11 Sheets-Sheet 9

Edward P. Drake
Inventor

By
Attorney

June 25, 1940.  E. P. DRAKE  2,205,397
AUTOMATIC PITTING MACHINE
Filed Aug. 23, 1937  11 Sheets-Sheet 10

Edward P. Drake, Inventor

June 25, 1940.  E. P. DRAKE  2,205,397
AUTOMATIC PITTING MACHINE
Filed Aug. 23, 1937  11 Sheets—Sheet 11

Edward P. Drake
Inventor
By
Attorney

Patented June 25, 1940

2,205,397

UNITED STATES PATENT OFFICE 2,205,397

AUTOMATIC PITTING MACHINE

Edward P. Drake, Los Angeles, Calif., assignor to Lindsay Ripe Olive Company, Lindsay, Calif., a corporation Application August 23, 1937, Serial No. 160,380

18 Claims. (Cl. 146—27)

This invention relates to the art of fruit packing equipment and particularly to fruit pitting machines.

While my invention is suitable for use in pitting various kinds of fruits, the preferred embodiment disclosed herein was designed with particular reference to the removal of stones from olives.

It is an object of my invention to provide a fruit pitting machine which is adapted to handle a continuous stream of olives; which is adapted to position each of the olives in said stream with the pit thereof disposed on an axis along which the pitting operation is to take place; and in which the pits and unpittted fruit are discharged separately from the pitted fruit.

The manner of accomplishing the foregoing objects, as well as further objects and advantages will be made manifest in the following description taken in connection with the accompanying drawings in which:

Fig. 3 is an enlarged fragmentary longitudinal sectional view of an upper portion of the machine shown in Fig. 1;

Fig. 4 is a detailed sectional view taken on the line 4—4 of Fig. 3;

Fig. 9 is an enlarged detailed sectional view taken on the line 9—9 of Fig. 3;

Fig. 10 is a fragmentary detailed view taken on the line 10—10 of Fig. 9, portions of this view being broken away to illustrate the construction of the parts shown therein;

Fig. 11 is a diagrammatic view taken on the line 11—11 of Fig. 9;

Fig. 12 is a fragmentary sectional view taken on the line 12—12 of Fig. 2;

Fig. 13 is a fragmentary sectional view taken on the line 13—13 of Fig. 2;

Figure 2:
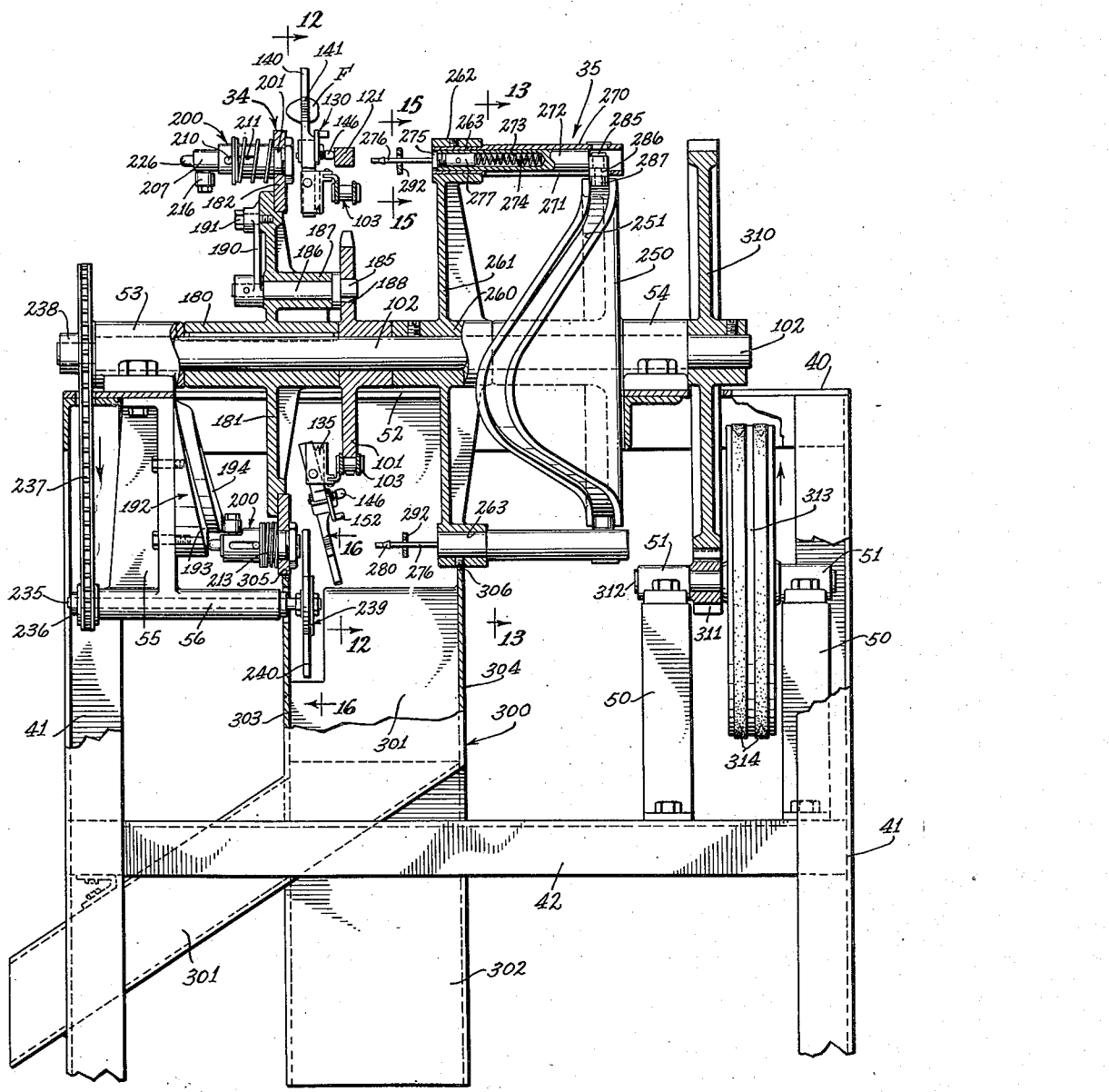
Fig. 2 is an enlarged diagrammatic cross-sectional view taken on the line 2—2 of Fig. 1.
Figure 5:
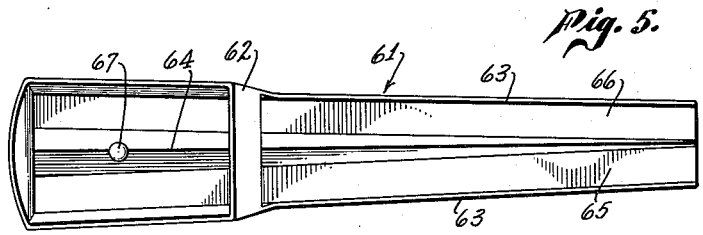
Fig. 5 is a plan view taken in the direction of the arrow 5 of the fruit feed conveyor of my invention.
Figure 15:
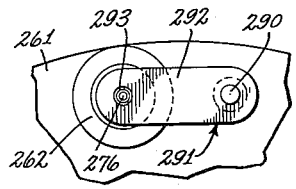
Figure 16:
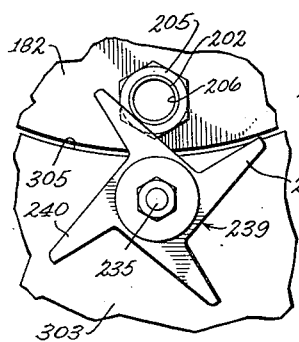
Figures 20, 21:
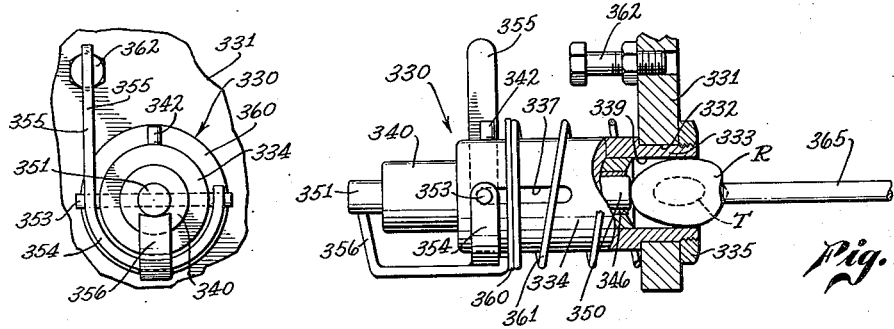
Figure 22:
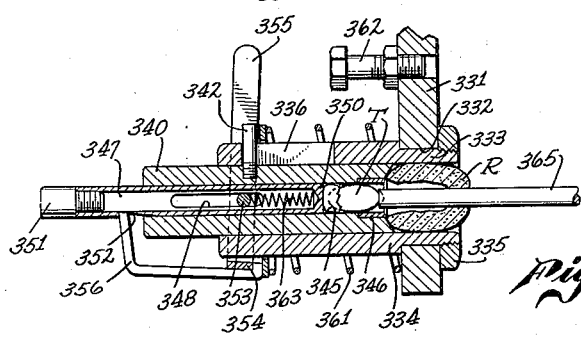
Figure 23:
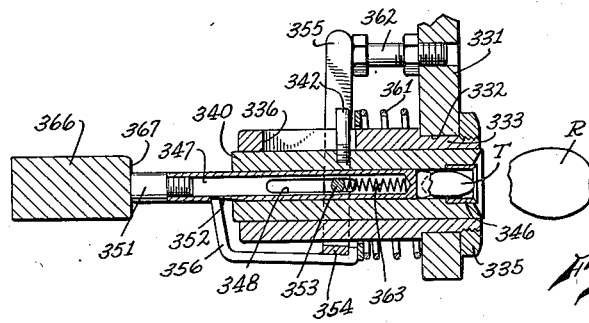
Figure 24:
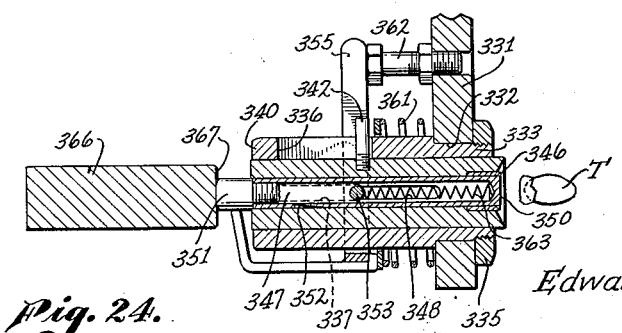
Figure 25:
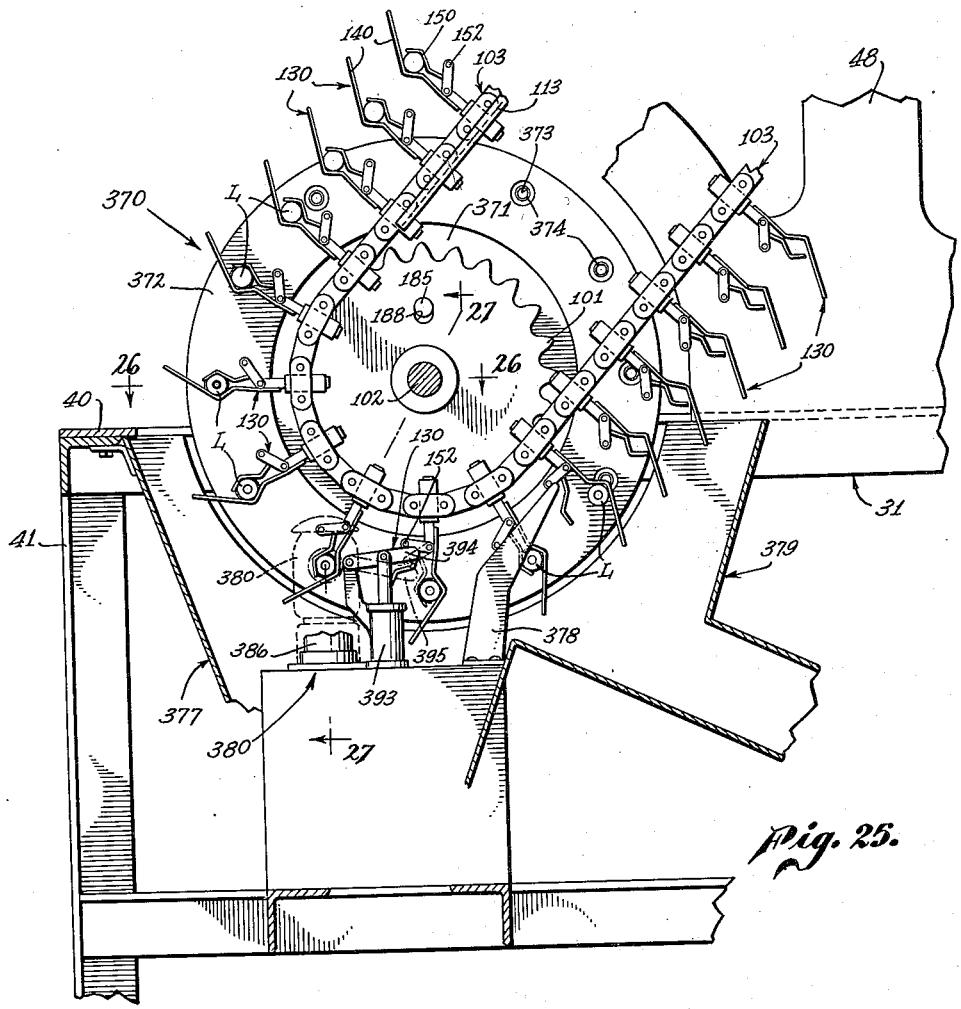
Figure 26:
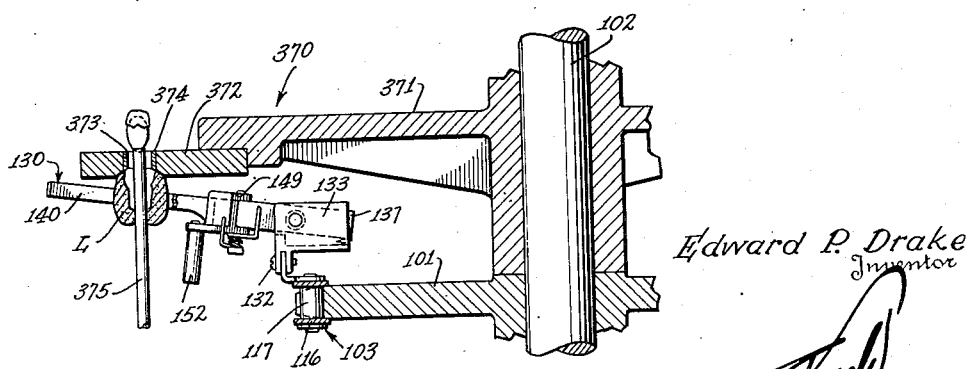
Figure 27:
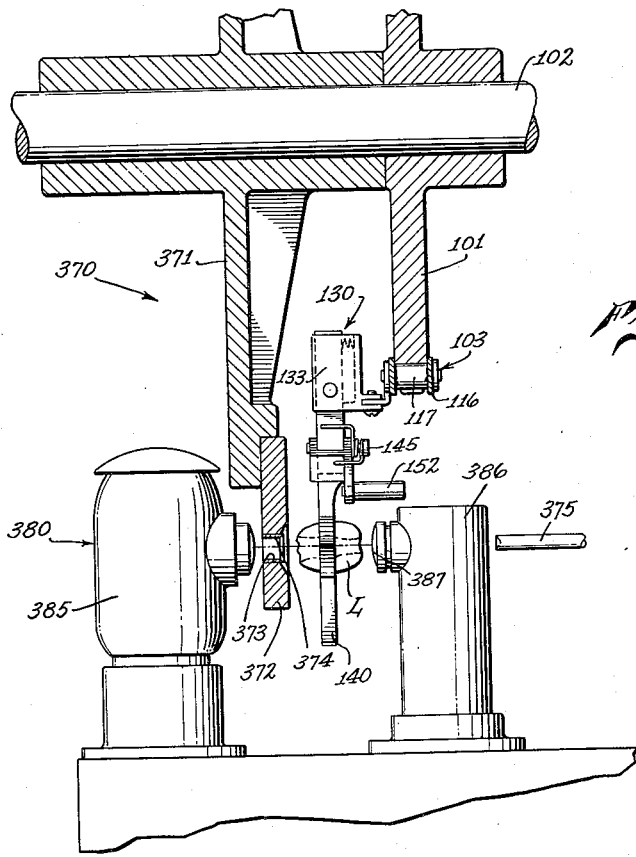
Figure 28:
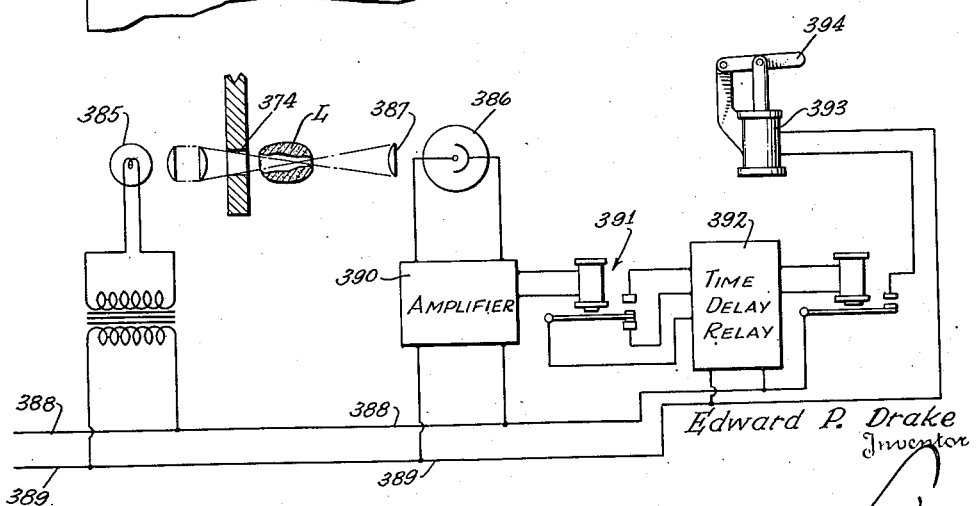

Fig. 15 an enlarged detail sectional view taken on the line 15—15 of Fig. 2;

Fig. 16 is an enlarged diagrammatic detailed view taken on the line 16—16 of Fig. 2;

Fig. 17 is an enlarged cross-sectional view of one of the die mechanisms of the die wheel of my invention with an olive disposed therein and about to have the pit punched therefrom;

Fig. 18 is a view similar to Fig. 17 which shows the pit punched from the olive;

Fig. 19 is a view similar to Fig. 18 and shows the olive and pit both removed from the die mechanism;

Fig. 20 is a view similar to Fig. 17 but showing a modified form of die device of my invention;

Fig. 21 is an elevational view of the die devices shown in Fig. 20;

Fig. 22 is a view similar to Fig. 20 but entirely in section illustrating the punching of a pit from an olive within the modified pit punch device of my invention;

Fig. 23 is a view similar to Fig. 22 illustrating the freeing of an olive successfully pitted in the modified pit die device of my invention;

Fig. 24 is a view similar to Fig. 23 illustrating the modified pit die device of my invention with the plunger thereof disposed as when ejecting therefrom a pit or an olive on which the pitting operation was unsuccessful;

Fig. 25 is a diagrammatic fragmentary sectional view illustrating a modified form of pitting machine of my invention;

Fig. 26 is an enlarged fragmentary horizontal sectional view taken on the line 26—26 of Fig. 25;

Fig. 27 is an enlarged vertical sectional view taken on the line 27—27 of Fig. 25;

Fig. 28 is a diagrammatic view illustrating the electrical wiring system and apparatus associated therewith and embodied in the modified form of my pitting machine illustrated in Figs. 25, 26 and 27.

I shall now refer specifically to the drawings, the preferred embodiment of my invention illustrated therein comprising a fruit pitting machine 30 having a frame 31 which supports a fruit feed mechanism 32, a fruit aligning and delivering mechanism 33, a rotary pit die wheel 34 and a rotary pit punch wheel 35.

The frame 31

The frame 31 includes a table-like structure having a horizontal plate 40, legs 41 and bracing 42 extending between these legs. The frame 31 also includes a superstructure comprising a pair of plates 48 and 49 which are rigidly mounted on the plate 40. Supported on the bracing 42 are brackets 50 supporting bearings 51. Provided in the horizontal plate 40 is an opening 52, on opposite sides of which are provided bearings 53 and 54. Extending downwardly from the plate 40 just beneath the bearing 53 is a bracket 55 on the lower end of which is a bearing 56. Provided on the super-structure side plates 48 and 49 (see Fig. 6) are bearings 57.

Fruit feed mechanism 32

This feed mechanism includes a hopper 59 with a discharge opening 60 which hopper is rigidly supported on upper portions of frame plates 48 and 49 (see Fig. 1) and a vibrating conveyor table 61 having a small hopper 62 at one end thereof which is disposed beneath the discharge opening 60. Said table has side walls 63 and a septum 64 which divides the space between these walls into channels 65 and 66. For a purpose which will be made clear hereinafter, septum 64 has a post 67 provided thereon which rises upwardly into the discharge mouth 60 of the fixed hopper 59.

Figure 6:
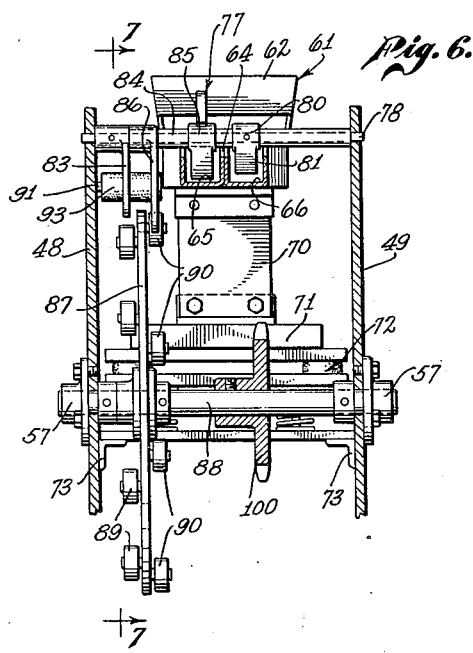
Fig. 6 is an enlarged fragmentary cross-sectional view taken on the line 6—6 of Fig. 3.

The vibrating conveyor table 61 is supported on springs 70 which are inclined slightly from the vertical and secured at their lower ends to a base 71 which is yieldably supported on flexible supports 72 fixed upon angle irons 73 which are mounted on the inner faces of the frame plates 48 and 49, (see Figs. 3 and 6). Mounted on the base 71 is an electrically energized vibrator unit 75 having an armature 76 which is connected to the table 61.

As shown in Fig. 3, the right hand ends of the run-ways 65 and 66 are open. The angle at which the springs 70 are set is such that when the vibrator 75 is energized to cause a vibration of the vibrator conveyor table 61, fruit is fed downwardly from the hopper 60 into the hopper 62 of the table 61 along the run-ways 65 and 66 on the opposite sides of septum 64. As it is necessary that only one piece of fruit be discharged at a time from the feed table 61, a governing mechanism 77 for this discharge is provided as follows: Journalled in the frame plates 48 and 49 is a light shaft 78 having fixed thereon a fruit control member 80 having a fruit release finger 81 and a fruit retarding finger 82. The device 80 is located in the discharge end of the fruit run-way 66. Also fixed on the shaft 78 is an operating arm 83.

Surrounding the shaft 78 between the arm 83 and the member 80 is a tubular sleeve 84 on which a member 85 is mounted which is identical with the member 80 but is disposed in the discharge end of the run-way 65. Sleeve 84 has an operating arm 86 which extends downwardly alongside the arm 83.

The member 80 and the member 85 are adapted to be rocked by the swinging of the arms 83 and 86 so as to alternately place each of these members in a full line position in which member 85 is shown in Fig. 3, and in the dotted line position in which device 80 is shown in Fig. 3, for the purpose of controlling the feeding of fruit from the right hand discharge end of the conveyor table 61. The actuation of arms 83 and 86 to effect this control is accomplished by a disk 87 which is fixed upon a shaft 88 journalled in the bearings 57, the disk 87 lying in a plane disposed midway between the arms 83 and 86. On opposite sides of disk 87 and about the periphery thereof are rollers 89 and 90, the former engaging the arm 83 when the disk 87 is rotated by the shaft 88, the rollers 90 during such rotation engaging the arm 86.

Mounted on the inner face of the frame plate 48 are short rods 91 and 92, the first of which has a rubber cushion 93 disposed opposite the arms 83 and 86 and the latter of which has springs 94 which are connected to the arms 83 and 86 and pull each of these arms back against the cushion 93 when it is disengaged by one of the rollers 89 or 90.

The rotation of the disk 87 in the direction of arrow 95, results in the oscillation of the control devices 80 and 85 between the full line and broken line positions shown in Fig. 3, so as to permit the discharge of pieces of fruit one at a time from the right hand end of the conveyor table 61, these pieces of fruit being discharged alternately from the run-ways 65 and 66.

Fruit aligning and delivering mechanism 33

This mechanism includes a sprocket 100 which is fixed on shaft 88; a sprocket 101 which is mounted on a shaft 102 journalled in the bearings 53 and 54; and a roller chain 103 which encircles these sprockets. The chain 103 is maintained in taut condition by an idle sprocket 104 mounted on an arm 105 which is in turn pivotally mounted by a bolt 106 upon the frame plate 49 and adapted to be controlled to varying the tautness of the chain 103 by a bolt 107 extending through a slot 108 in the plate 49 (see Figs. 1 and 3).

The sprocket 101 is connected to the shaft 102 so as to be driven by the latter in a manner to be made clear hereinafter. The rotation of the sprocket 101 causes the sprocket 100 to rotate which in turn rotates the shaft 88 and the disk 87 fixed thereto.

Fixed on the inner face of the frame plate 49 are two U-shaped brackets 110 having lower arms 111 and upper arms 112. Mounted on the upper faces of the lower arms 111 is a channel iron 113, this being accomplished by screws 114 which extend downwardly through suitable apertures in a track 115 and the channel iron 113, after which these screws are threadedly received in suitable apertures formed in the arm 111 (see Fig. 9). The track 115 is in alignment with the upper flight 116 of the chain 103 so that rollers 117 of said chain ride on the upper faces of the track 115. Secured to the lower faces of the upper arms 112 of the brackets 110 are a strap cam 120 and a bar cam 121. The opposite ends of the strap cam 120 are deflected upwardly as shown in Figs. 3 and 12, while opposite ends of the bar cam 121 are arcuately bent downward to extend partially around the shafts 88 and 102. Mounted on the lower arcuate end portion 123 of the bar cam 121 is an auxiliary strap cam 124 as shown in Fig. 12.

Each of the links of the chain 103 has mounted thereon a fruit gripping device 130. Each of these devices has a right angle bracket 131 which is attached directly to the link which carries this device, this bracket being secured by a screw 132 to a base member 133 having a back wall 134 and side walls 135. Pivotally mounted between the side walls 135 on a pin 136 (see Figs. 9, 10 and 11) is a body block which is rotatably urged about the pin 136 in a given direction by a spring 138 (see Fig. 9). Secured upon the upper end of the body block 137 is a leading finger 140 which is shaped, as shown in Fig. 10, to provide a bend 141 therein.

Extending through and rigidly mounted in the upper end of the body block 137 is a pin 145, the inner end 146 of which is rounded and adapted to be swung into contact with the bar cam 121, when opposite this, by the action of the spring 138. Pivotally mounted on the pin 145 are the two legs 147 and 148 of a following finger supporting arm 149. This arm has rigidly fixed thereto a following finger 150 having a bend 151 therein which is spaced from the axis of the pin 145 the same distance as the bend 141 of the finger 140 is spaced therefrom.

The end of arm 149 has a cam follower pin 152. Wrapped around a turned down portion of the pin 146 is a coil spring 153 which has its ends bent to engage the body block 137 and the arm 149 to continually urge the latter towards a position in which the fingers 140 and 150 are in contact with each other. The pin 152 extends into a position in which it engages the strap cam 120 whenever brought opposite the latter by the travel of the chain 103. When any of the fruit gripping devices 130 is disposed opposite the auxiliary strap cam 124, the pin 152 thereof engages the inner face of said strap cam as shown in Fig. 12, so as to rotate the arm 149 to swing the finger 150 away from the finger 140.

Figure 8:
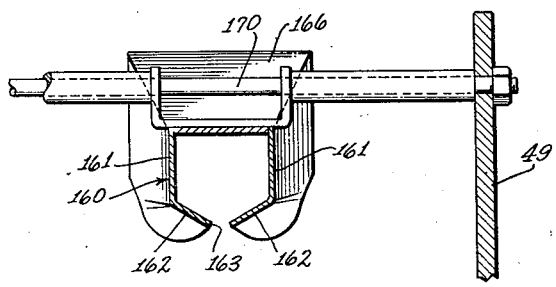
Fig. 8 is a detailed sectional view taken on the line 8—8 of Fig. 3.

Supported between the plates 48 and 49 just over the upper flight 116 of the chain 103 and sloping downwardly at a slightly greater angle than said flight is a fruit chute 160. This chute includes side walls 161 having inclined flanges 162 extending downwardly and inwardly from their lower edges to leave a slot 163 between the inner lower edges of these flanges. The walls 161 are held in spaced relation by brackets 165 and their upper ends are united to form a hopper 166 which is positioned to receive fruit being discharged from the right hand end of the vibrator feed table 61 (see Figs. 3 and 8). The upper end of the chute 160 is supported by a bolt 170 which passes through the frame plates 48 and 49. At its lower end this chute is supported by a U-shaped bracket 171 having slots 172 which receive eccentrics 173 fixed on a shaft 174 which is journalled in the frame plates 48 and 49 and has an arm 175 by which the eccentrics 173 may be manipulated to adjust the spacing of the lower end of the chute 160 from the upper flight 116 of the chain 103 (see Figs. 3 and 4).

The chute 160 is so located relative to the upper flight 116 of the chain 103 that the fingers 140 and 150 of the fruit gripping device 130 extend upwardly into the bottom slot 163 of the chute 160, as shown in Figs. 3 and 9. At the upper end of the chute 160 the only fingers to extend up through the slot 163 are the leading fingers 140, this being caused by the fact that these are longer than the fingers 150 and partly because the fingers 150 are deflected downwardly by the engagement of the pin 152 with the strap cam 120.

Rotary pit die wheel 34

This device includes a rotary base 180 which is fixed upon shaft 102 just inside the bearing 53 and has a webbed disk 181 formed integral therewith, this disk having secured thereto a die ring 182 so that the latter is concentric with the shaft 102. A driving connection is made between the rotary base 180 and the sprocket 101 by an eccentric 185 provided on the end of a shaft 186 journalled in the bearing 187 on the base 180, said eccentric extending into a radial slot 188 in the sprocket 101. Means for graduated rotation of the shaft 186 to make relatively slight adjustments in the rotational relation of the sprocket 101 to the rotary pit die 34 is adapted to be accomplished by an arm 190 provided on the outer end of the shaft 186 and adjustably secured to the rotary base 180 by a cap screw 191.

Mounted on the bracket 55 of the frame 31 is a cam base 192 having cam faces 193 and 194 (see Fig. 2) these cam faces being disposed concentrically relative to the axis of the shaft 102.

The die ring 182 is provided with a series of pit die devices 200, the detailed construction and operation of which are clearly shown in Figs. 14, 17, 18 and 19. Each of the devices 200 is mounted in one of a series of holes 201 provided in the ring 182. Into this hole fits a neck 202 of a tubular shell 203 of the device, the device being secured rigidly in place by a nut 205 which is screwed on to the inner end of the neck 202. The tubular shell 203 has a cylindrical bore 206 in which a tubular pit die holder 207 is slidably mounted, this holder being held against rotation relative to said shell 203 by pins 210 extending outwardly from the die holder 207 through longitudinal slots 211 formed in the shell 203. Disposed about the shell 203 and lying against the pins 210 is a washer 212, a light spring 213 between this washer and the ring 182 yieldably retaining the holder 207 in the position in the shell 203, in which it is shown in Fig. 17, so that the inner end of the bore 206 of this shell is open to receive an olive.

The shell 203 has an arcuate recess 215 which is adapted to receive a cam follower roller 216 mounted on the outer end of the die holder 207. The die holder 207 has a bore 217 which is counterbored at its inner end to receive a pit die 218 having a hardened annular cutting edge 219 exposed inwardly. Mounted within the bore 217 by a sleeve 220 fixed in the outer end thereof is a pit ejector 225 including a cam following head 226 on its outer end, a pit engaging head 227 on its inner end and a light spring 228 in between the head 227 and the sleeve 220. The sleeve 220 is rigidly held in place by a set screw 230 and the spring 228 normally holds the pit ejector 225 inwardly, as shown in Fig. 17.

The cam faces 193 and 194 of the cam base 192 (see Figs. 2 and 14) are aligned, respectively, with the cam following heads 226 and the cam following rollers 216 of the pit die devices 200 and control the operation of the latter in a manner which will be made clear hereinafter.

Journalled in bearing 56 is a light shaft 235 having a sprocket 236 which is connected by a chain 237 to a sprocket 238 fixed on the shaft 102 so as to continually rotate a spider wheel 239 fixed on the opposite end of the shaft 235 so that the arms 240 of the spider wheel sweep across the open ends of the bores 206 of the devices 200 as the latter rotate with the rotary pit die base 180 (see Figs. 2 and 16).

Rotary pit punch wheel 35

Provided on the bearing 54 and preferably integral therewith, is a punch cam 250 having a cam race-way 251 (see Figs. 2 and 14), this raceway facing outwardly and being disposed in a plane concentric with the shaft 102. Fixed on the frame 31 as shown in Fig. 13, is a cam 255 having a race-way 256 which also is disposed concentric with the shaft 102.

Journalled on the shaft 102 between the sprocket 101 and the bearing 54 is a punch wheel base 260 having a circular disk 261 reinforced by webs cast integral therewith and provided about its periphery with a series of punch mounting sockets 262, these sockets having bores 263 and being disposed in axial alignment with the pit die devices 200 on the rotary pit die wheel 34. Secured in place in each of the bores 263 of the sockets 262 is a cylindrical slide shell 270 having a slot 271 along its inner face. Slidably disposed in each of the shells 270 is a punch plunger 272 having a bore 273 containing a coil spring 274, the mouth of this bore containing a plug 275 which slidably receives a pit punch 276. Inside the plug 275 the punch 276 has a piston 277 against which the spring 274 presses to yieldably hold the punch 276 in fully extended position (see Fig. 2). Each of the pit punches 276 has an enlargement 280 thereon, the forward portion 281 of which is tapered at a slight angle, and the rear portion 282 of which is tapered at a steep angle (see Figs. 17 and 19).

Each of the plungers 272 has a pin 285 (see Fig. 2) extending inwardly therefrom, this pin having a roller 286 which lies in the slot 271 and a roller 287 which extends into the cam race 251 of the cam 250 so that as the pit punch wheel 35 rotates, the pit mounting plungers 272 are slided inwardly and outwardly in their cylindrical shells 270.

Extending through apertures formed in the disk 261 in between adjacent punch mounting sockets 262, are plungers 290 of a series of strippers 291, one of these strippers being provided for each of the punches 276. The inner end of each of the plungers 290 has a stripper plate 292 having an aperture 293 which receives a punch 276 adjacent thereto. The outer end of each of the plungers 290 is rigidly fixed upon a slide block 294, the ends of which are recessed to receive and slide upon adjacent faces of the punch mounting shells 270 disposed alongside this stripper plunger. Coiled about each stripper plunger 290 between the wheel disk 261 and the slide block 294 of that stripper is a light coil spring 295 which yieldably urges the stripper 291 into a retracted position. Each stripper has provided on the block 294 a cam following roller 296 which, with the rotation of the pit punch wheel 35, engages the cam 255 and enters the race-way 256 thereof to cause the strippers 291 to perform their stripping function, as will be made clear hereinafter (see Figs. 13 and 14).

Secured on the frame 31 (see Figs. 1, 2 and 12) is a double hopper 300 including a hopper 301 for pits and unpitted olives and a hopper 302 for pitted olives. The hopper 300 has side walls 303 and 304 (see Fig. 2) the first of these having an arcuate upper edge 305 which extends in close proximity to the periphery of the die ring 182 of the die wheel 34. The hopper wall 304 on the other hand has an arcuate upper edge 306 which closely conforms to the periphery of the punch wheel 35.

Figure 1:
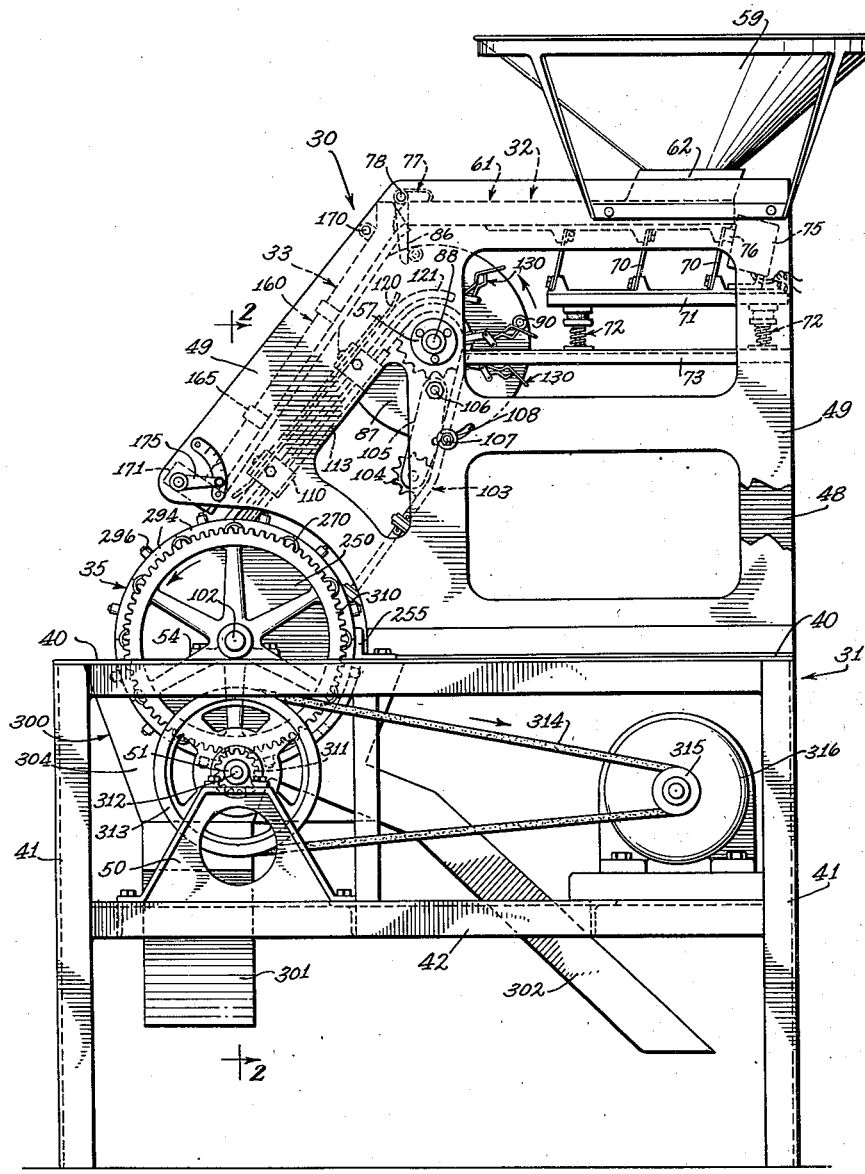
Fig. 1 is a side elevational view of a preferred embodiment of a fruit pitting machine of my invention.

Fixed on the outer end of shaft 102 adjacent to bearing 54 is a master gear wheel 310, this meshing with a gear pinion 311, which is fixed on a shaft 312 journalled in bearings 51. Also fixed on shaft 312 is a V-belt pulley 313 which is connected by suitable belts 314 to a pulley 315 of an electric drive motor 316 which is mounted, as shown in Fig. 1, on the frame 31.

Operation

The manner of operating the machine 30 of my invention is as follows:

To begin with, it should be noted that the olives, before they are fed to the machine 30, are sized and olives of only one size are fed to the machine at a time. This is because the die devices 200 are built to handle only fruit within a relatively small range of diameters. Thus, when it is desired to use the machine 30 to pit fruit of a diameter not within that particular range it is necessary to replace the die devices 200 on the machine with others of a proper size to handle the new lot of fruit. Furthermore, certain adjustments have to be made in the machine when changing from one size of fruit to another, as will be made clear hereinafter.

Figure 7:
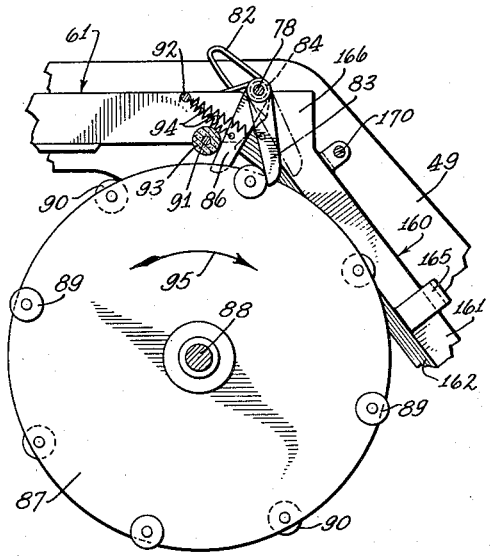
Fig. 7 is a fragmentary detailed sectional view taken on the line 7—7 of Fig. 6.

The motor 316 is energized so as to rotate the various parts of the machine in the directions indicated by the arrows in the several views and the vibrator 75 is also energized to set up a vibration in the feed table 61 of a character to cause fruit fed into the hopper 62 thereof to progress along the run-ways 65 and 66 until these pieces of fruit are discharged one by one by the feed regulating members 80 and 85 (see Figs. 6 and 7). The supply of fruit now being fed to the hopper 60 is caused to progress along the table 61 and be fed therefrom one piece at a time into the upper end of the chute 160 (see Fig. 3). Due to the energizing of the motor 316, the chain 103 and fruit gripping devices 130 are continually travelling about the sprockets 100 and 101 with the upper flight 116 of this chain travelling downwardly along the rail 115 (see Fig. 9). While the links of the chain 103 are disposed in the upper flight 116 thereof, the fruit gripping devices 130 are held in position as shown in Fig. 9 so that fingers 140 extend upwardly through the slot 163 of the chute 160 (see Fig. 3) and so that one of the fingers 140 is disposed in place to support each piece of fruit as it is fed into the upper end of the chute 160. As each finger 140 supporting a given piece of fruit travels downwardly with the chain 103, this piece of fruit is caused to roll on the downwardly inclined flanges 162 of the chute 160 until it is gradually caused by the natural forces thus set up to roll to a position where the axis of the fruit is disposed exactly across the longitudinal axis of the chute 160.

One of the things which assists this action to take place is the mounting of the chute 160 so as to converge towards the upper flight 116 of the chain 103. As the fruit is thus caused to roll behind the fingers 140 down the chute 160, the following fingers 150 are held out of contact with the fruit by the engagement by the pins 152 with the strap cam 120. Owing to the convergence of the chute 160 and the upper chain flight 116 however, and the upward curvature of the lower portion of the strap cam 120, the following fingers 150 are extended upwardly through the bottom slot 163 of the chute 160 until, just before each fruit gripping device reaches the lower end of this chute, the following finger 150 swings towards the finger 140 so as to grip between these fingers the piece of fruit which has been rolling down the chute 160 behind that particular finger 140.

Shortly after the fingers 140 and 150 have thus gripped a piece of fruit such as an olive F, they pass downwardly beyond the lower end of the chute 160 and come opposite an upwardly disposed portion of the die wheel 34 as shown in Fig. 2. From this view it will be seen that the olive F now extends in overlapping relation with the inner ends of the die devices 200. The positioning of the gripping devices 130 in this manner is caused by the contact of the pins 146 thereof with the bar cam 121 and in order to prevent the olive F being damaged by colliding with the die wheel 34 this cam bar has a depression or dwell 320 formed therein (see Fig. 14) which permits each fruit gripping device just before it comes directly opposite the die wheel 34 to swing inwardly until the olive F held thereby is disposed directly on the axis of one of the die devices 200 after which the pin head 146 travels past the end of the dwell 320 thus causing the fruit gripping device 130 to be rocked back and insert one end of the olive F into the die device 200 with which it is in alignment. This operation is clearly shown in the upper portion of Fig. 14.

While the olive F is thus being partially inserted into the bore 206 of the pit die device 200 with which it is aligned, the punch 276 which is mounted in the punch wheel 35 in axial alignment with this die device is shifted towards the olive F by the travel of the roller 287 on the mounting plunger 272 of this punch in the race 251 of the punch shifting cam 250. This movement of the punch 276 continues until the punch engages the olive, as shown in Fig. 17, presses the olive firmly into the bore 206 of the shell 203, penetrates the flesh of the olive, engages the pit S of the latter and pushes this pit through the pit die 218 and against the plunger head 227 collapsing the spring 228, as substantially shown in Fig. 18.

The punch 276 is here shown in its extreme punching position in which the enlargement 280 on the punch has penetrated entirely into the pit cavity within the olive. Immediately following the punching of the pit from the olive as above described, the punch is withdrawn along its own axis, and closely following this withdrawal the end 226 of the pit ejector 225 engages the cam face 193 of the cam 192, and the roller 216 of the die holder 207 engages the face 194 of this cam so that the olive F is assisted from the bore 206 by the shifting of the die holder 207 from its normal position to the position that is shown in Fig. 19, while at the same time the pit S is ejected from the bore 217 of the die holder 207 so as to be expelled inwardly from the die device 200 in which this pit was removed from the olive F.

Figure 14:
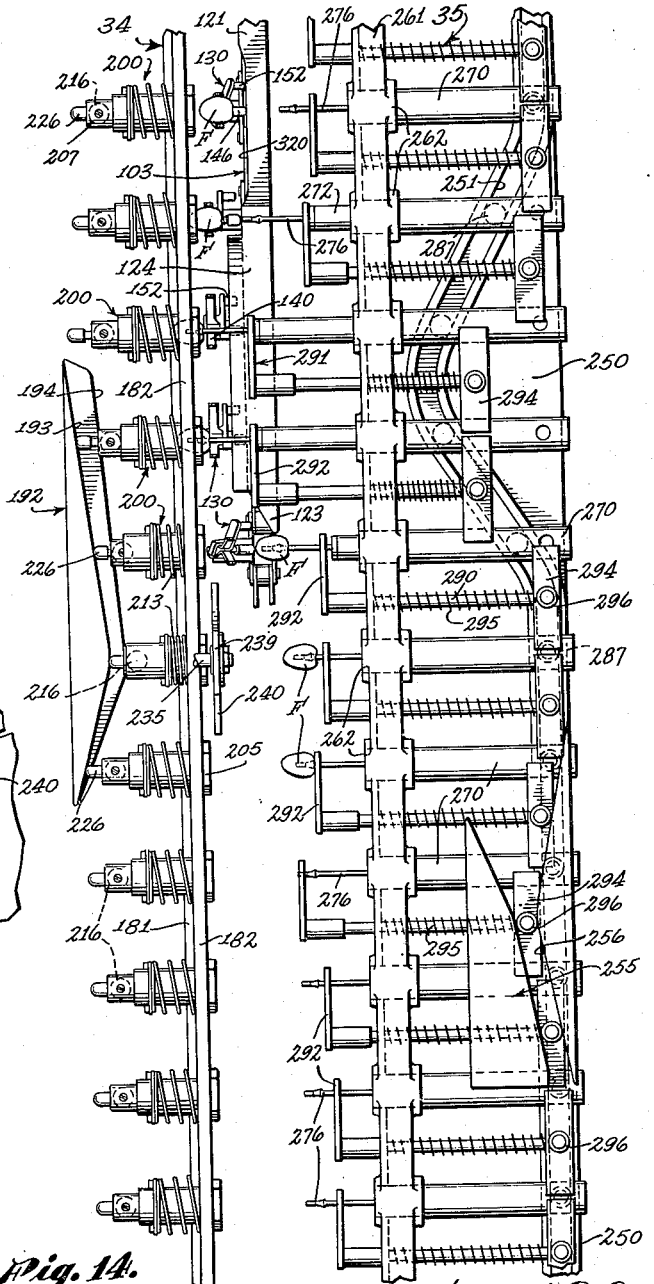
Fig. 14 is a diagrammatic view showing in development the peripheral mechanism on the die wheel and punch wheel of my invention and illustrating the operation of this mechanism.

The resistance set up by the enlargement 280 on the punch 276 to the withdrawal of the punch from the olive F assures that this olive will remain on this punch after the pitting operation. As the punch wheel 35 continues to rotate however, the stripper 291, the plate 292 of which surrounds the pit punch 276 on which the olive F is supported, is caused to shift inwardly by the engagement of its roller 296 with the cam 255 as shown in Fig. 14, so as to strip the olive F from this punch 276. This stripping action takes place after the olive F is disposed over the hopper 302 so that this olive, and all other pitted olives in a similar manner, are dropped into this hopper and gravitate downwardly therein into a container provided to receive these. In order to prevent the pits S of the fruit from being carried by their momentum over into the hopper 302, the spider wheel 239 is provided to rapidly rotate in a position in which its fingers engage the pits S, as these are ejected by the ejectors 225 of the die devices 200, and return these pits into the hopper 301 provided to receive these.

One of the features of the machine of my invention is the segregation which takes place therein between the olives which are successfully pitted and which all pass down the hopper 302, and the olives which are not successfully pitted. Failure of the olives to be pitted in the operation of the machine 30 as above described, may result from several different causes. One of these is where the pit S is abnormally large in diameter so that it cannot be forced through the pit die 219. Another cause of failure of the olive to be pitted is where an olive slightly off-size or approximately spherical is introduced into the machine and as the result of the shape or size of the olive the latter is introduced into the bore 206 of one of the die devices 200, so that the pit S of this piece of fruit is cocked with its axis out of alignment with the bore of the pit die 218. When an attempt is made to pit an olive either with too large a pit or with the olive improperly positioned, as above pointed out, the pitting operation is frustrated by the inability of the punch to force the pit into the die 218. Where this happens, the punch 276 is unable to penetrate the devices 200 as far as shown in Fig. 18 so that a certain portion of the full stroke of the pit plunger 272 of this punch is absorbed by the collapsing of the spring 273 in this plunger.

When the punch 276 is thus unable to pit an olive, the olive is not retained on the punch as is the case in Fig. 19, but instead is ejected from the device 200 into which it was fed, into the position shown by the letter S in Fig. 19, where the unpitted olive is engaged by the arms of the spider wheel 239 and propelled rearwardly into the hopper 301 for receiving pits and unpitted olives.

As stated hereinabove, the machine 30 is adapted to handle only one size of olives at a time and for each substantially different size of olives which the machine handles it must be provided with a set of die devices 200 especially adapted to handle that particular size. For each different size of olives to be handled by the machine certain other adjustments are also necessary. One of these requires the manipulating of the handle 175 so as to raise or lower the lower end of the chute 160 so that at the time the following finger 150 of each finger gripping device 130 is allowed to swing forwardly and grip the olive against the leading finger 140 of that device, the olive is supported by the chute 160 so that when gripped between these two fingers it is contacted by portions of those fingers lying both above and below the bends 141 and 151 of said fingers. The adjustment of the chute 160 up and down for this purpose is necessary because the axis of the olive being gripped by each pair of fingers 140 and 150 must at the time it is gripped lie in the plane of travel of the apices of the bends 141 and 151 of these fingers in order to prevent the axis of the olive being disturbed as a result of its transfer from the chute 160 to where it is entirely supported by a pair of fingers 140 and 150.

Another adjustment which is required in changing from one size of fruit to another is accomplished by manipulation of the arm 190 (see Figs. 2 and 12) to shift the eccentric 185 and thereby readjust the radial relation between the sprocket 101 and the die wheel 34, this being necessary to bring olives of the diameter for which the adjustment is made, when gripped between the fingers 140 and 150, into accurate alignment with the pitting axes, that is the axes of the punches 276 and die devices 200 when these olives are carried by the finger gripping devices 130 into the pitting zone between the die wheel 34 and the punch wheel 35. This latter adjustment is necessary because the leading fingers 140 are in a fixed position on the finger gripping devices 130, and where the diameter of the fruit handled is substantially changed, it is necessary to alter the position of the entire finger gripping devices 130 as regards the pitting axes of the die wheel 34 and punch wheel 35 in order that the axes of the fruit being pitted coincide with said pitting axes.

I shall now describe a modified form of die device 330, the construction and operation of which are shown in Figs. 20 to 24 inclusive. This device is adapted to be used in the machine 30 without alteration of the latter, excepting to make provision for elements shown in Figs. 20 to 24 inclusive and described hereinafter. The devices 330 are mounted in a die wheel ring 331 having a series of holes 332 into which necks 333 of cylindrical shells 334 extend and in which they are retained by nuts 335. Each of the shells 334 has a slot 336, a pair of slots 337 and an olive receiving bore 339 in which a cylindrical pit die sleeve 340 is slidably mounted. The sleeve 340 has a pin 342 which slides in the slot 336 and limits the movement of this sleeve relative to the shell 334. The sleeve 340 has a bore 345, the inner end of which is counterbored to receive a pit die 346. Slidable in the bore 345 is a hollow cylindrical pit plunger 347 having a longitudinal slot 348, a head 350 at its inner end, a plug 351 screwed into its outer end and a notch 352 formed in one side thereof.

Extending through suitable apertures in the sleeve 340 and through the slots 337 and 348 is a pin 353 having a yoke 354 pivotally mounted on its opposite ends. This yoke has an arm 355 and a latch finger 356, the latter being disposed adjacent the face of the plunger 347 in which the notch 352 is formed. Surrounding the body 334 is a washer 360, while coiled around this body and confined between the washer 360 and the die wheel ring 331 is an expansion spring 361. Adjustably fixed in the die wheel ring 331 is a stop screw 362, the latter engaging the arm 355 when the pin 353 and associated parts are shifted inwardly, as shown in Fig. 23. Trapped in the plunger 347 between its head 350 and the pin 353 is a coil spring 363.

When the machine 30 of my invention is equipped with pit die devices 330, pit punches 365 are preferably used which are smooth, as shown in Fig. 20, and in place of cam 192, a cam 366 is provided which is concentrically disposed relative to the shaft 102 and has a cam face 367 which converges towards the die ring 331.

The operation of the modified form of pit die devices 330 of my invention is as follows: When an olive R is delivered by the finger gripping devices 130 into the bore 339 of one of the devices 330, the parts of the devices are disposed as shown in Fig. 20. The punching of the pit T from the olive R is shown in Fig. 22, where it is seen that the pit has engaged the plunger 347 and by compressing the spring 363 moves this plunger outwardly until the notch 352 comes opposite the latch finger 356 which, under the influence of the spring 361, moves into this notch.

When the pit punch 365 now retires it does not, because of its smooth outer surface, carry the olive R with it so that this olive is free to drop down into the first of a pair of hoppers provided to receive the successfully pitted olives on the one hand, and the second such hopper receiving the pits and the olives on which the pitting operation was unsuccessful. The punch 365 having been withdrawn from the olive R, the plunger head 351 then comes in engagement with the cam surface 367 as shown in Fig. 23, which, owing to the latch finger 356 engaging the notch 352, shifts the die sleeve 340 so as to expel the olive R from the bore 339. This expulsion of the olive and its deposit in the first of the two hoppers provided precedes the expulsion of the pit T which follows, as shown in Fig. 24, as a result of the engagement of the arm 355 with the stop screw 362, thus disengaging the finger 356 from the notch 352 and permitting the plunger 347 to completely eject the pit T.

In case an olive fed to one of the devices 330 should not be successfully pitted therein, the pit would not pass through the die 346, as shown in Fig. 22, and the plunger 347 would not be cocked rearwardly as shown in this figure. Under this situation, the unpitted olive would remain in the bore 339 until approximately the same moment in the rotation of the die wheel 134 as is illustrated in Fig. 24. At this moment, engagement of the cam face 367 with the plunger head 351 would eject the unpitted olive so that this would gravitate into the second hopper which is provided for receiving pits and unpitted olives. Having passed through a pitting cycle as above described, the device 330 moves out of range of the cam 366 and returns to the condition in which it is shown in Fig. 20, where it is in readiness for receiving another olive to be pitted.

I shall now specifically describe the modified form of the machine 30 of my invention which is diagrammatically illustrated in Figs. 25 to 28 inclusive. This modified machine which may be designated by the reference character 370 is exactly like the machine 30 excepting for the details which will now be described.

The machine 370 has a pit die wheel 371 which is provided with a die ring 372, the latter having holes 373 which directly receive pit dies 374. These pit dies are so positioned that the olive gripping devices 130 hold olives L against the dies 374 with the pits of the olives in alignment with the axes of these dies and with punches 375 so that when the latter travel along these axes in the pit punching operation they penetrate the olives L on the axes of the pits therein and punch these pits through the dies 374 as shown in Fig. 26. These pits drop downwardly into a hopper 377 (see Fig. 25) and the pitted olives continue in the grip of the devices 130 until the latter are tripped by a cam 378 to discharge the pitted olives in a hopper 379.

The mechanism 380 is provided in the machine 370 for the purpose of inspecting the olives L after the pitting operation has been performed upon these, to determine whether or not this operation has been successful and to segregate the olives which have been successfully pitted from those on which the pitting operation has been unsuccessful. The mechanism 380 includes a lamp or source of light 385 and a photoelectric cell 386, these being located on the same optical axis with the latter located to coincide with the pitting axis of each of the dies 374 and its corresponding punch 375 at the moment when each die and its corresponding punch have been rotated a sufficient distance, after the pitting operation, to permit this punch to be fully withdrawn as shown in Fig. 27, this moment occurring a substantial period before the gripping device 130 engages the cam 378. Thus an olive L which has just been subjected to a pitting operation between a pit die 374 and punch 375 is still held with the axis of the olive coinciding with the axis of this die and punch when the latter axis comes into coincidence with the optical axis of the source of light 385 and the photoelectric cell 386. Where the pitting operation has been successful, the results of this coincidence of axes is illustrated in Figs. 27 and 28 in which it is seen that light rays from the source of light 385 pass through the die 374 and the olive L, and through a lens 387 to energize the photoelectric cell 386.

As shown in Fig. 28, the source of light 385 is energized by electricity supplied through conductors 388 and 389 which also supply electricity to an amplifier 390 which is connected with the photoelectric cell 386 so as to energize a relay 391 when the cell 386 receives a ray of light from the source 385. Relay 391 in turn controls a time delay relay 392 which causes a solenoid 393 to be energized after a slight delay following the reception by the cell 386 of a ray of light from the source 385. The solenoid 393 controls a shiftable cam 394 which is normally elevated as shown in full lines in Fig. 25, but which is drawn downwardly into a depressed position 395 when the solenoid is energized.

Whenever the pitting operation on an olive L is successful, the pit of course is removed from the inside of the olive so as to permit the light ray to pass from the source 385 to the photoelectric cell 386, thereby energizing the latter and causing the cam 394 to be depressed a short time thereafter into its depressed position 395. This permits the olive L, through which the ray of light thus passed, to be retained by the gripping device 130 carrying this olive until this gripping device passes over the hopper 379 and engages the cam 378 which releases this olive, allowing it to drop down into this hopper.

When the pitting operation is not successful however, the pit remains in the olive L and prevents the passage of any ray of light from the source 385 to the cell 386 when this olive passes between the latter. This failure of the photoelectric cell 386 to be energized results in the shiftable cam 394 remaining in its uppermost position, as shown in full lines in Fig. 25, and in the pin 152 of the device 130 holding this olive L engaging the cam 394 so as to release the fingers of this device from the olive L and permit the latter to gravitate downwardly into the hopper 377.

Thus, it is seen that the pits and the unpitted olives are automatically segregated from the pitted olives by the modified form 370 of my invention.

What I claim is:

1. In combination: a sloping chute; means for feeding individual pieces of fruit into an upper portion of said chute; a series of spaced travelling fruit retarding means moving along said chute to retard the downward travel of said pieces of fruit along said chute, said retarding means and said chute co-operating to roll said pieces of fruit into positions with the longitudinal axes of the latter disposed across the direction of travel of said pieces of fruit along said chute; and means for capturing said pieces of fruit with their axes disposed as aforesaid.

2. A combination as in claim 1, in which said spaced travelling means includes a series of fingers extending into the path of fruit along said chute.

3. A combination as in claim 1, in which said spaced travelling means includes a series of fingers extending into the path of fruit along said chute, and in which said fruit capturing means includes a means for gripping individual pieces of fruit against said fingers.

4. A combination as in claim 1, in which the bottom of said chute upon which said pieces of fruit roll is concave so as to engage each piece of fruit rolling thereon at a plurality of points on opposite sides of the axis of travel of fruit along said chute.

5. In a fruit pitting machine the combination of: a continuously moving pit die mechanism, said mechanism including a shell having a fruit receiving pocket; a pit die in the bottom of said pocket; a plunger for ejecting a pit from said die; means for ejecting a piece of fruit from said pocket; a yieldable pit punch adapted to punch a pit from a piece of fruit in said pocket and force said pit into said die; means for retaining a pitted piece of fruit on said punch when said punch is withdrawn from said pocket; and means for actuating said punch and said pit and fruit ejecting means co-ordinately to pit said fruit and to eject from said pocket a piece of fruit which said punch has been unable to pit at the same time that a pit would have been ejected from said die had said piece of fruit been successfully pitted.

6. In a fruit pitting machine the combination of: a pit punch; a pit die; means for supporting said punch and die in spaced relation in alignment with each other; means for positioning individual pieces of fruit between said punch and die; means to cause relative movement between said punch and die to cause said punch to penetrate said fruit and punch the pits from said fruit into said die where this is possible; means permitting said relative movement means to yield when a piece of fruit resists the punching of a pit therefrom with an excessive force; means for receiving pits and the pieces of fruit on which the pitting operation was unsuccessful; means for retaining on said punch each piece of fruit which is successfully pitted; and means for stripping said last mentioned pieces of fruit from said punch and segregating said pitted fruit from said pits and said unpitted fruit.

7. A combination as in claim 6, in which said means for retaining said pitted fruit on said punch comprises an enlargement provided on said punch.

8. In a fruit pitting machine, the combination of: means for holding a series of individual pieces of fruit and carrying said pieces of fruit over a given path; yieldable means for pitting each of said pieces of fruit as said fruit is held by the aforesaid means, said pitting means yielding when an excessive resistance is met with to pit one of said pieces of fruit; test means including a photo-electric cell and a source of light, said cell and light being located so that a beam of light coming from said source travels through a hole in each of said pieces of fruit when said piece of fruit has been successfully pitted, said beam of light then impinging on said cell; electroresponsive means set in motion by the impingement of light by said cell to cause said fruit holding means to deliver said last mentioned piece of fruit to a place for receiving successfully pitted fruit; and means for causing said fruit holding means to deliver each piece of fruit which is not penetrated by said beam of light to a place for holding fruit on which the pitting operation was unsuccessful.

9. In combination: a sloping chute; means for feeding individual pieces of fruit into an upper portion of said chute so that said pieces of fruit will roll individually down said chute; a series of spaced retarding fingers; conveyor means for carrying said fingers in a continual movement along said chute to retard the gravitation of said pieces of fruit down said chute, said fingers causing said pieces of fruit to assume positions with the axes of said pieces of fruit disposed at right angles to the direction of travel of said pieces of fruit down said chute; means for seizing said pieces of fruit individually while they are thus rolling down said chute in contact with said fingers and rigidly holding said pieces of fruit when thus seized in said positions which they have attained while rolling down said chute; and means for pitting said fruit when it is thus held as aforesaid.

10. In combination: a sloping chute with a central slot in the bottom thereof; means for feeding elongated rollable articles into the upper end of said chute; a series of retarding fingers adapted to enter from below and travel in said slot; and endless travelling means for supporting and carrying said fingers in a continuous movement in said chute to regulate the downward movement of said articles in said chute so as to cause said articles to assume a position with their major axes disposed across the longitudinal axis of said chute.

11. In combination: a sloping chute; means for feeding elongated rollable articles into the upper end of said chute; a series of retarding fingers; endless travelling means for supporting and carrying said fingers in a continuous movement along said chute to regulate the downward movement of said articles in said chute so as to cause said articles to assume a position with their major axes disposed perpendicular to the longitudinal axis of said chute; and means travelling over an endless path for gripping said articles when they arrive at a certain point in said chute and for rigidly holding said articles in the position in which they were first gripped while said articles are being carried by said gripping means for a given distance so as to permit an operation to be performed upon said articles with a given relation to the major axes thereof.

12. In combination: a downwardly sloping chute having a slot in the middle thereof the major portion of its length, portions of the floor of said chute on opposite sides of said slot sloping inwardly toward said slot; and means extending up through and travelling downwardly in said slot for retarding individual elongated articles placed in said chute and causing said articles to assume positions with their major axes disposed substantially perpendicular to said slot and with said axes lying substantially in a horizontal plane.

13. In combination: a troughlike chute having a slotted bottom along which elongated articles are adapted to be rolled, opposite sides of said bottom being inclined downwardly towards each other; and finger means extending up through said slotted bottom into said chute and travelling longitudinally in said chute, said finger means being adapted to engage and regulate the movement of said elongated articles along said chute, contact of said articles with said chute bottom and said finger means causing said articles to assume positions in which their major axes are disposed horizontally and at right angles to the longitudinal axis of said chute.

14. In combination: a troughlike chute having a bottom along which elongated articles are adapted to be rolled, opposite sides of said bottom being inclined downwardly towards each other; finger means extending into said chute and travelling longitudinally along said chute, said finger means being adapted to engage and regulate the movement of said elongated articles along said chute, contact of said articles with said chute bottom and said finger means causing said articles to assume positions in which their major axes are disposed horizontally and at right angles to the longitudinal axis of said chute; and means for seizing said articles when they are thus positioned and conveying said articles to a place where an operation may be performed on said articles with a fixed reference to the major axes thereof.

15. A combination as in claim 14 in which the elongated articles mentioned therein may be pieces of fruit; and a pitting mechanism for pitting said pieces of fruit while they are being held by said seizing means.

16. In a fruit pitting machine, the combination of: an annular battery of fruit pitting mechanisms; means for rotating said battery on a horizontal axis; means for properly positioning individual pieces of fruit with their axes disposed horizontally and in alignment with said battery of fruit pitting mechanisms so that this fruit is pitted by said battery as the latter revolves about its horizontal axis; and means operating in timely relation with said battery of pitting mechanisms for segregating properly pitted fruit from fruit on which the pitting operation was unsuccessful.

17. In a fruit pitting machine, the combination of: continuously moving means for pitting pieces of fruit and in such operation punching a hole entirely through the fruit, a photo-electric device having its beam in line with the hole in the fruit in connection with a solenoid permitting a current to pass only when the fruit has such a hole therethrough and to thereby energize the solenoid, fruit gripping means travelling past the solenoid to transport individual pieces of fruit after the pitting operation to a receptacle for pitted fruit, such means normally so functioning when the solenoid is energized as the fruit gripping means passes by it, and cam means on the solenoid engaging the fruit gripping means when the solenoid is not energized and causing the fruit gripping means to release the fruit into a receptacle for unpitted fruit.

18. An olive pitting machine comprising: an olive receiving hopper, a tray communicating with the hopper to receive olives therefrom, means to vibrate the tray to cause the olives to be transported therealong, a chute connected with the tray and inclined downwardly therefrom, a metering device associated with the tray and chute having members adapted to be actuated in timed relation to pass the olives one at a time from the tray into the chute, grippers to position olives while traveling down the chute and hold them in a predetermined position, and a die and punch mechanism comprising dies aligned with the olives in their said predetermined position adapted to be actuated to receive olives from the grippers, and punches adapted to be actuated to spear the olives and to push the pits therefrom.

EDWARD P. DRAKE.